United States Patent
Song et al.

(10) Patent No.: US 9,489,588 B2
(45) Date of Patent: Nov. 8, 2016

(54) MATTING METHOD FOR EXTRACTING FOREGROUND OBJECT AND APPARATUS FOR PERFORMING THE MATTING METHOD

(71) Applicant: POSTECH ACADEMY-INDUSTRY FOUNDATION, Gyeongsangbuk-do (KR)

(72) Inventors: Woo Jin Song, Gyeongsangbuk-do (KR); Meiguang Jin, Bern (CH); Byoung Kwang Kim, Gyeongsangbuk-do (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 14/700,511

(22) Filed: Apr. 30, 2015

(65) Prior Publication Data
US 2016/0110876 A1    Apr. 21, 2016

(30) Foreign Application Priority Data
Oct. 15, 2014  (KR) .................. 10-2014-0138865

(51) Int. Cl.
G06K 9/00 (2006.01)
G06K 9/46 (2006.01)
G06T 7/00 (2006.01)

(52) U.S. Cl.
CPC .......... G06K 9/4604 (2013.01); G06T 7/0081 (2013.01); *G06T 2207/10024* (2013.01); *G06T 2207/20144* (2013.01)

(58) Field of Classification Search
CPC ................ G06T 7/0083; G06T 7/408; G06T 2207/10024; G06T 2207/20144; G06K 9/4604

See application file for complete search history.

(56) References Cited

U.S. PATENT DOCUMENTS

| 7,692,664 B2 | 4/2010 | Weiss et al. |
| 2007/0165966 A1* | 7/2007 | Weiss ..................... H04N 5/275 382/284 |
| 2011/0229024 A1* | 9/2011 | El-Maraghi ........... G06T 7/0083 382/162 |
| 2011/0293247 A1 | 12/2011 | Bhagavathy et al. |
| 2015/0220805 A1* | 8/2015 | Chen ..................... G06T 7/0081 382/199 |

FOREIGN PATENT DOCUMENTS

| KR | 1020090111939 A | 10/2009 |
| KR | 10-0960694 B1 | 5/2010 |
| KR | 1020110124222 A | 11/2011 |

OTHER PUBLICATIONS

Byoung-Kwang Kim, et al; "Local and Nonlocal Color Line Models for Image Matting", IEICE Trans. Fundamentals, vol. E97-A, No. 8, Aug. 2014; pp. 1814-1819.

* cited by examiner

*Primary Examiner* — Phuoc Tran
(74) *Attorney, Agent, or Firm* — Ladas & Parry LLP

(57) ABSTRACT

A matting method and apparatus for extracting a foreground object are disclosed. The matting method includes extracting one or more pixels from an input image and a trimap; calculating a first processing cost by extracting one or more nonlocal neighboring pixels; calculating a second processing cost by extracting one or more local neighboring pixels; and performing matting on the input image by estimating an opacity value for each of the extracted pixels based on the first and second processing costs. Accordingly, it is possible to perform high-quality image matting, and thus increase a performance in extracting a to foreground object from the input image, so that the matting method and apparatus can be applied to multiple-purpose image editing software.

6 Claims, 4 Drawing Sheets

MATTING METHOD FOR EXTRACTING FOREGROUND OBJECT AND APPARATUS FOR PERFORMING THE MATTING METHOD

CLAIM FOR PRIORITY

This application claims priority to Korean Patent Application No. 2014-0138865 filed on Oct. 15, 2014 in the Korean Intellectual Property Office (KIPO), the entire contents of which are hereby incorporated by reference.

BACKGROUND

1. Technical Field

Example embodiments of the present invention relate in general to the field of image editing, and more particularly, to a matting method for extracting a foreground object by extracting neighboring pixels, each of which establishes either a nonlocal relationship or a local relationship with each pixel constituting an input image, and performing high-quality matting using the neighboring pixels, and an apparatus for performing the matting method.

2. Related Art

Recently, with the popularization of user terminals, such as a smartphone, a tablet PC, and a personal digital assistant (PDA), and the development of information processing technology, active research on image editing techniques that enable users to capture an image or record a video using their terminals and edit the captured image or recorded video to their taste is in progress.

Image editing techniques aim to create a new composite image by extracting a portion of one image upon request of a user and combining the extracted portion with another image. To this end, the image editing techniques inevitably require an image matting technique for precisely extracting a target object for editing from an image.

Generally, the image matting technique uses a trimap to extract a foreground object from an input image. The trimap of an image may refer to an image that schematically divide a foreground region, a background region, and an unknown region for the image.

Accordingly, what was proposed was a matting technique that allows for extracting a foreground object from a received input image and a received trimap of the input image based on a local propagation scheme or a nonlocal propagation scheme.

A local-propagation-based matting technique uses pixels within a predefined range of area in an input image and exhibits an excellent matting performance when a target foreground object represents a soft texture such as fur, but shows a reduced matting performance when the target foreground object includes an area with a complicated feature, such as a hole, which makes it difficult to distinguish the area between a foreground or a background, or the foreground object is represented by a combination of various colors.

On the other hand, the nonlocal-propagation-based matting technique uses pixels with similar characteristics in an input image and exhibits an excellent matting performance when a target foreground object includes an area with a complicated feature, such as a hole, or is represented by a combination of various colors, but shows a reduced matting performance when the object represents a soft texture, such as fur.

As such, the existing matting techniques are limited in that their matting performances drastically vary depending on conditions of a foreground object, such as appearance characteristics or colors, by which the foreground object is represented in an input image.

SUMMARY

Accordingly, example embodiments of the present invention are provided to substantially obviate one or more problems due to limitations and disadvantages of the related art.

Example embodiments of the present invention provide a matting method for extracting a foreground object, which is capable of performing high-quality matting regardless of conditions of the foreground object, such as appearance characteristics or colors, by which the foreground object is represented in an input image.

Example embodiments of the present invention also provide a matting apparatus for extracting a foreground object, which performs high-quality matting, thereby increasing a performance in extracting the foreground object from an input image, and thus can be applied to multiple-purpose image editing software.

In some example embodiments, a matting method for extracting a foreground object, which is performed by an information processing apparatus capable of digital signal processing, the matting method includes: extracting one or more pixels from a received input image and a received trimap of the input image; calculating a first processing cost by extracting one or more nonlocal neighboring pixels for each of the extracted pixels which establish nonlocal relationships with each of the extracted pixels; calculating a second processing cost by extracting, for each of the extracted pixels, one or more local neighboring pixels which are included within a predefined range for extraction and establish local relationships with each of the extracted pixels; and performing matting on the input image by estimating an opacity value of each of the extracted pixels based on both the first processing cost and the second processing cost.

The trimap may be an image that represents the input image by dividing the input image into a foreground region, a background region, and an unknown region.

The extracting of the one or more pixels may include extracting one or more pixels with an indefinite opacity value that are located in the input image and the unknown region of the trimap.

The calculating of the first processing cost may include generating a feature vector for each of the extracted pixels using color information and location information of each of the extracted pixels; extracting the one or more nonlocal neighboring pixels for each of the extracted pixels, which establish nonlocal relationships with each of the extracted pixels, by calculating distances among the pixels based on the generated feature vectors; and calculating the first processing cost for each of the extracted pixels using the extracted nonlocal neighboring pixels.

The extracting of the one or more nonlocal neighboring pixels may include calculating Euclidean distances among the extracted pixels using a K-nearest neighbors algorithm based on the feature vectors and extracting one or more pixels with smallest distances as the one or more nonlocal neighboring pixels.

The calculating of the second processing cost may include extracting one or more pixels within the predefined range for extraction that is based on each of the extracted pixels as the one or more local neighboring pixels that establish local relationships with each of the extracted pixels, and calculating the second processing cost for each of the extracted pixels using the one or more local neighboring pixels.

The performing of the matting on the input image may include computing a final processing cost using both the first processing cost and the second processing cost such that a processing cost for each of the extracted pixels can be minimized, and estimating an optimized opacity value for each of the extracted pixels based on the final processing cost.

The optimized opacity value for each of the extracted pixels may be used for the performing of the matting on the input image, thereby making it possible to extract a foreground object from the input image.

In other example embodiments, a matting apparatus for extracting a foreground object, which is implemented in an information processing apparatus capable of digital signal processing, the matting apparatus includes: a pixel extractor configured to extract one or more pixels from a received input image and a received trimap of the input image; a nonlocal processor configured to calculate a first processing cost by extracting one or more nonlocal neighboring pixels for each of the extracted pixels which establish nonlocal relationships with each of the extracted pixels; a local processor configured to calculate a second processing cost by extracting, for each of the extracted pixels, one or more local neighboring pixels which are included within a predefined range for extraction and establish local relationships with each of the extracted pixels; and a matting module configured to perform matting on the input image by estimating an opacity value of each of the extracted pixels based on both the first processing cost and the second processing cost.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
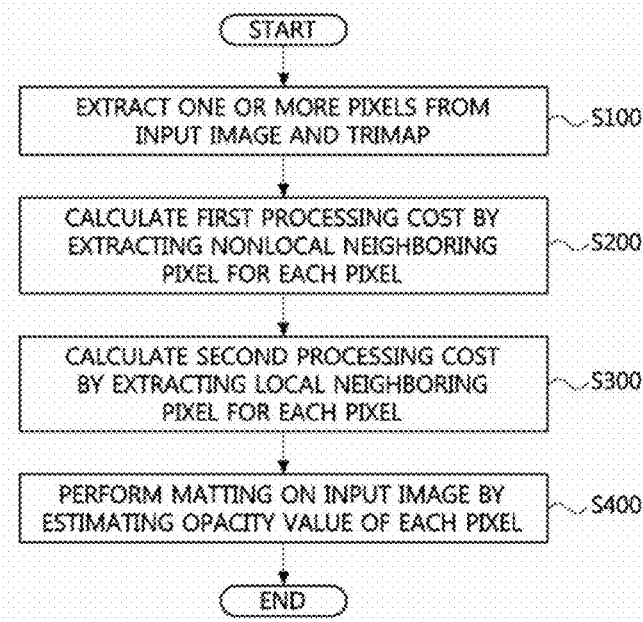
FIG. 1 is a flowchart illustrating a mailing method for extracting a foreground object according to an example embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described in detail with reference the accompanying drawings.

Figure 2:
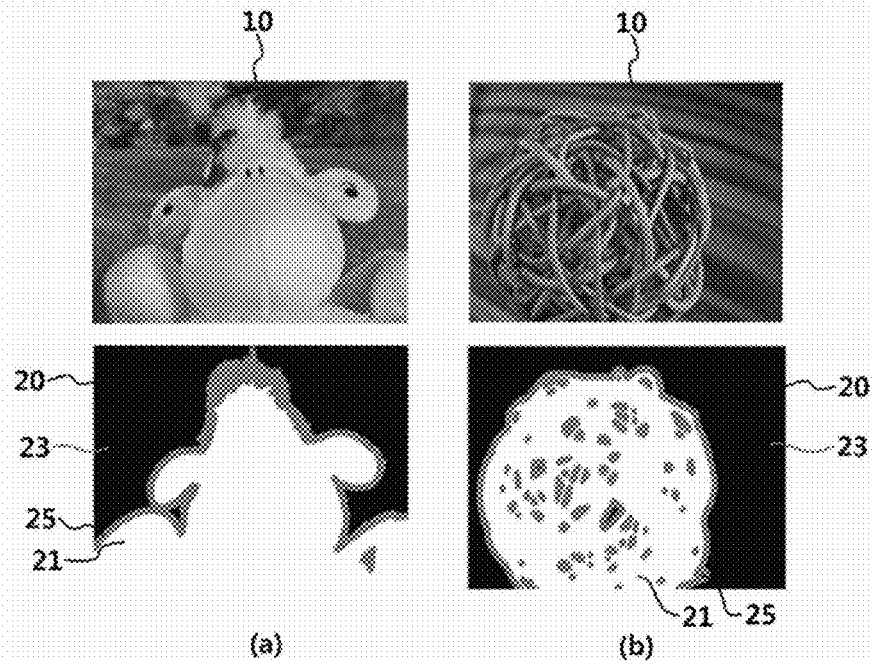
FIG. 2 is a diagram illustrating an example of an input image and a trimap according to an example embodiment of the present invention.

FIG. 1 is a flowchart illustrating a matting method for extracting a foreground object according to an example embodiment of the present invention, and FIG. 2 is a diagram illustrating an example of an input image and a trimap according to an example embodiment of the present invention.

Referring to FIG. 1, a matting method for extracting a foreground object may be performed by an information processing apparatus capable of digital signal processing.

Here, the information processing apparatus may include various terminals with one or more image sensors equipped therein for capturing an input image and with a capability of image processing for performing matting on the captured input image, wherein the various terminals may include a smartphone, a tablet PC, a personal digital assistant (PDA), a navigation system, a laptop computer, a computer, a smart electronic appliance, and a system robot. However, aspects of the present disclosure are not limited thereto, such that the information processing apparatus may include other various apparatuses that require matting techniques.

Previously, matting was performed on an input image using a local-propagation scheme or nonlocal-propagation scheme.

A local-propagation-based matting technique may be less effective when a foreground object represents a complex feature, such as a hole, which makes it difficult to distinguish between a foreground region and a background region, or the foreground object is represented by a combination of various colors, whereas a nonlocal-propagation-based matting technique may be less effective when a foreground object represents a soft texture, such as fur.

As described above, the existing matting techniques may be limited in that their matting performance may vary significantly depending on conditions of a foreground object, such as appearance characteristics or colors, by which the foreground object is represented in an input image.

Therefore, the present invention suggests a matting method that combines a local-propagation scheme and a nonlocal-propagation scheme in order to enable high-quality image matting regardless of conditions of a foreground object, such as appearance characteristics or colors, by which the foreground object is represented in an input image.

A matting method for extracting a foreground object in accordance with the present invention may include the following operations of: extracting in S100 at least one pixel from both an input image and a trimap; calculating in S200 a first cost value by extracting a nonlocal neighboring pixel for each pixel; calculating in S300 a second cost value by extracting a local neighboring pixel for each pixel; and performing in S400 matting on the input image by estimating an opacity value of each pixel.

First, in response to an input image and a trimap of the input image being input, one or more pixels may be extracted from the input image and trimap in S100.

Here, the input image may be an image or video captured by a TOF-based camera or an image sensor equipped in an information processing device. If a target foreground object to be extracted from the input image has a region that represents a soft texture, such as fur, or a region that represents a hole, it may be difficult to clearly distinguish whether the corresponding region is a foreground region or a background region, and hence there may be limitations in performing high-quality image matting.

Accordingly, a user may receive the trimap as well as the input image, where the trimap defines a foreground region, a background region, and an unknown region in the input image. That is, the trimap may represent the input image by dividing it into a foreground region, a background region, and an unknown region.

More specifically, for example, as described in (a) of FIG. 2, a trimap 20 for an input image 10 which includes a target object to be extracted that has an area representing a soft texture, such as fur, may divide the input image 10 into three regions and display the regions using different colors: a white color for displaying a foreground region 21 that is clearly recognized as the target object to be extracted; a black color for displaying a background region 23 that is not recognized as the foreground region 21; and a gray color for displaying an unknown region 25 that includes a particular region which is not clearly distinguished between the foreground region 21 and the background region 23 as the region in question has an area that represents a soft texture, such as fur.

Similarly, as shown in (b) of FIG. 2, another example of the trimap 20 for the input image 10 having a target object to be extracted that has a hole may display the input image 10 by dividing it into three different regions: a foreground region 21 clearly recognized as the target object to be extracted; a background region 23 distinctly not recognized as the foreground region 21; and an unknown region 25 that is not clearly distinguished between the foreground region 21 and the background region 23.

That is, the unknown region 25 in the trimap 20 may include a boundary region between the foreground region 21 and the background region 23, i.e., the boundary line between an object and a non-object or an indistinct region that is hardly distinguishable between the foreground region and the background region due to unique appearance characteristics of the object.

In this case, precise matting may not be performed on pixels of the unknown region 25 (hereinafter, referred to as "unknown pixels") due to their indefinite opacity values, unlike the pixels on the foreground region 21 (hereinafter, referred to as "foreground pixels") or the pixels on the background region 23 (hereinafter, referred to as "background pixels"), which have definite opacity values. Accordingly, the present invention aims to obtain estimation of opacity values of unknown pixels in order to perform high-quality image matting.

To this end, one or more unknown pixels with an indefinite opacity value may be extracted from the input image 10 and the trimap 20.

In response to extraction of the unknown pixels with an indefinite opacity value, one or more nonlocal neighboring pixels for each of the extracted unknown pixels are extracted, wherein the nonlocal neighboring pixels establish nonlocal relationships with a corresponding unknown pixel, and the first processing cost may be calculated in S200.

A method for calculating the first processing cost by extracting nonlocal neighboring pixels will be described in detail with reference to FIGS. 3 and 4.

Figure 3:
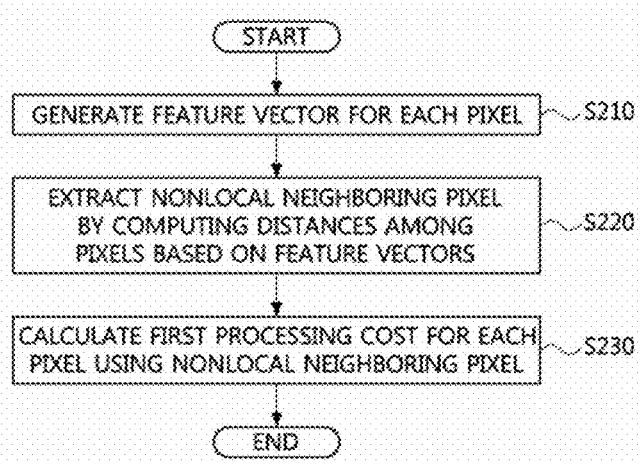
FIG. 3 is a flowchart illustrating a method for calculating a first processing cost using one or more nonlocal neighboring pixels according to an example embodiment of the present invention.

FIG. 3 is a flowchart illustrating a method for calculating the first processing cost using one or more nonlocal neighboring pixels according to an example embodiment of the present invention, and FIG. 4 shows graphical illustrations for describing extraction of one or more nonlocal neighboring pixels according to the example embodiment of the present invention.

Referring to FIG. 3, the method for calculating the first processing cost may include the following operations of: generating in S210 a feature vector for each pixel; extracting in S220 one or more nonlocal neighboring pixels for each pixel which establish nonlocal relationships with a corresponding pixel by calculating distances among the pixels based on the generated feature vectors; and estimating in S230 the first processing cost for each pixel by using the extracted nonlocal neighboring pixels.

[Equation 1]

$$X(i)=(I^R,I^G,I^B,x,y)_i \qquad (1)$$

Referring to Equation 1, a feature vector $X(i)$ for at least one unknown pixel i with an indefinite opacity value, which is located at an unknown region of the input image and trimap, may be generated in S210.

In Equation 1, $I^R$ represents a red (R) channel value of the pixel i in the input image I; $I^G$ represents a green (G) channel value of the pixel i in the input image I; and $I^B$ represents a blue (B) channel value of the pixel i in the input image I. In addition, x and y are coordinate values of a pixel in the input image.

That is, the feature vector for an unknown pixel having an indefinite opacity value may be generated based on color information and location information of the pixel represented in the input image.

[Equation 2]

$$\|X(i)-X(j)\| \qquad (2)$$

Once feature vectors for the respective unknown pixels having an indefinite opacity value are generated, one or more nonlocal neighboring pixels for each of the unknown pixels having an indefinite opacity value which establish nonlocal relationships with a corresponding unknown pixel may be extracted by computing Euclidean distances among the pixels through Equation 2 as shown above using the feature vectors for the respective pixels in S220.

Figure 4A:
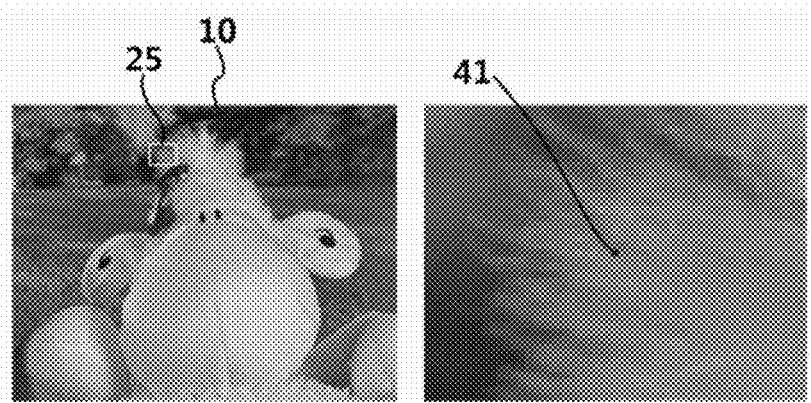
FIG. 4A shows graphical illustrations for describing extraction of one or more nonlocal neighboring pixels according to the example embodiment of the present invention.

More specifically, for example, as shown in FIG. 4A, when the target object to be extracted from the input image 10 has an area that represents a soft texture, such as fur, Euclidean distances from each unknown pixel to an arbitrary reference pixel 41 in the unknown region 25 may be computed based on a K-nearest neighbors algorithm and the feature vectors of the unknown pixels, and K number of pixels with the smallest Euclidean distances to the reference pixel 41 may be extracted as nonlocal neighboring pixels.

Figure 4B:
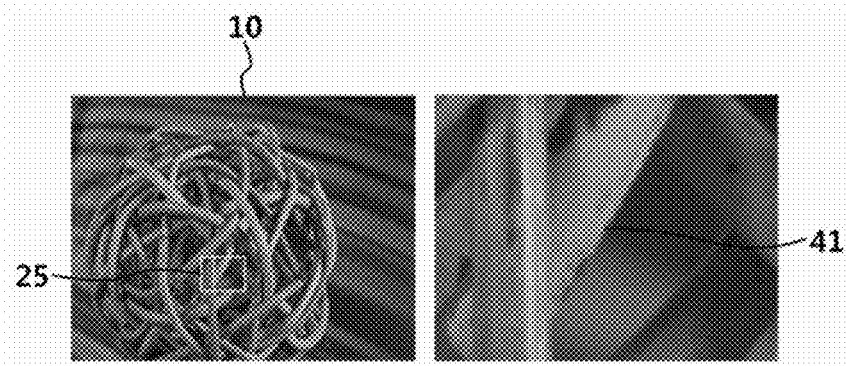
FIG. 4B shows graphical illustrations for describing extraction of one or more nonlocal neighboring pixels according to the example embodiment of the present invention.

Similarly, if the target object to be extracted from the input image 10 has an area such as a hole, as shown in FIG. 4B, Euclidean distances from each unknown pixel to an arbitrary reference pixel 41 in the unknown region 25 may be computed based on a K-nearest neighbors algorithm and the feature vectors of the unknown pixels, and K number of pixels with the smallest Euclidean distances to the reference pixel 41 may be extracted as nonlocal neighboring pixels.

[Equation 3]

$$J_n=\alpha^T L_n \alpha \qquad (3)$$

In response to extraction of one or more nonlocal neighboring pixels for each unknown pixel which establish nonlocal relationships with a corresponding unknown pixel, the first processing cost $J_n$ for each pixel may be computed by a cost function, Equation 3, as shown above.

In Equation 3, $\alpha$ represents an N×1 vector, and $L_n$ represents an N×N Laplacian matrix. $L_n$ for (j, k)-th element may be computed using Equation 4 as below.

[Equation 4]

$$\sum_{i|(j,k)\in N_i} \left( \delta_{jk} - \frac{1}{|N_i|}\left(1 + (I_j-\mu_i)^T\left(\Sigma_i + \frac{\epsilon}{|N_i|}I_3\right)^{-1}(I_k-\mu_i)\right)\right), \qquad (4)$$

where $N_i$ represents at least one nonlocal neighboring pixel for the pixel i, and $\Sigma_i$ represents a 3×3 covariance matrix for the pixel i. In addition, $\mu_i$ represents an average RGB color value for $N_i$, and $I_3$ represents a 3×3 unit matrix. $\epsilon$ represents a predefined constant for normalization of $\alpha$.

Referring back to FIG. 1, the second processing cost may be calculated by extracting one or more local neighboring pixels for each of the unknown pixels having an indefinite opacity value which establish local relationships with a corresponding unknown pixel in S300.

That is, one or more pixels within a predefined range for extraction that is based on each of one or more unknown pixels having an indefinite opacity value may be extracted as local neighboring pixels which establish local relationships with a corresponding unknown pixel.

[Equation 5]

$$J_l=\alpha^T L_l \alpha \qquad (5)$$

In response to extraction of one or more local neighboring pixels for each of the unknown pixels, the second processing cost $J_l$ for each unknown pixel may be computed based on a predefined cost function, Equation 5 as above.

Here, $\alpha$ represents an N×1 vector, and $L_l$ represents an N×N Laplacian matrix. $L_l$ for (j, k)-th element may be computed using Equation 6 as below.

[Equation 6]

$$\sum_{i|(j,k)\in M_i} \left( \delta_{jk} - \frac{1}{|M_i|}\left(1 + (I_j-\mu_i)^T\left(\Sigma_i + \frac{\epsilon}{|M_i|}I_3\right)^{-1}(I_k-\mu_i)\right)\right), \qquad (6)$$

where $M_i$ represents at least one local neighboring pixel for the pixel i, and $\Sigma_i$ represents a 3×3 covariance matrix for the pixel i. In addition, $\mu_i$ represents an average RGB color value for $M_i$, and $I_3$ represents a 3×3 unit matrix. $\epsilon$ represents a predefined constant for normalization of $\alpha$.

As the first processing cost and the second processing cost for each unknown pixel are computed as described above, matting on the input image may be performed by estimating an opacity value of each unknown pixel based on the computed first and second processing costs in S400.

To estimate an opacity value of each unknown pixel, a final processing cost J may be computed using a predefined cost function, Equation 7 as below, such that the processing cost for each pixel can be minimized.

[Equation 7]

$$J = \mu J_n + (1-\mu)J_l + \lambda(\alpha^T - b_S^T)Ds(\alpha - b_S) \qquad (7)$$
$$= \mu \alpha^T L_n \alpha + (1-\mu)\alpha^T L_l \alpha + \lambda(\alpha^T - b_S^T)Ds(\alpha - b_S),$$

where $J_n$ represents the first processing cost computed based on one or more nonlocal neighboring pixels for each pixel that establish nonlocal relationships with a corresponding pixel, and $L_n$ represents an N×N Laplacian matrix for computing $J_n$. In addition, $J_l$ represents the second processing cost computed based on one or more local neighboring pixels for each pixel which establish local relationships with a corresponding pixel, and $L_l$ represents an N×N Laplacian matrix for computing $J_l$. Further, $\mu$ is a constant ranging between 0 and 1 that determines the importance of the nonlocal relationship and the local relationship for the pixel, and $\lambda$ is a predefined constant.

$b_s$ represents an N×1 vector into which opacity values, i.e., α, of foreground pixels and background pixels of the trimap are written. When the pixel of interest is a foreground pixel or background pixel in the trimap, $D_s$ represents an N×N diagonal matrix having "1" as a diagonal element, and when the pixel of interest is an unknown pixel, $D_s$ represents an N×N diagonal matrix having "0" as a diagonal element.

[Equation 8]

$$(\mu L_n | (1\mu) L_l | \lambda D_s)\alpha = \lambda b_s \qquad (8)$$

Equation 8 as shown above represents a linear system that minimizes the final processing cost J. The linear system may be solved using various methods, such as an inverse matrix, a conjugate gradient method, and guided filtering, and an optimized opacity value a for each pixel can be estimated from the linear system.

Accordingly, it is possible to precisely extract the foreground object from the input image through matting on the input image by using the optimized opacity values.

Figure 5:
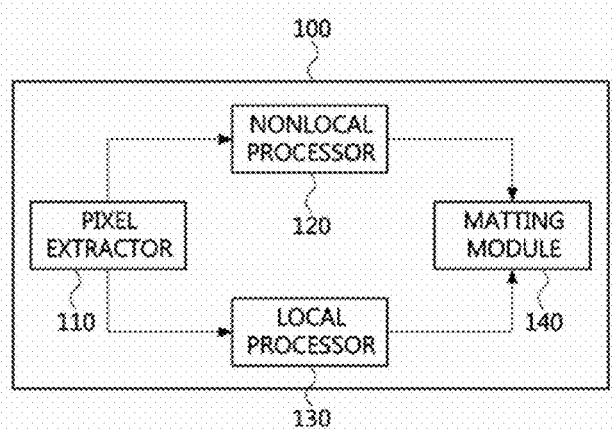
FIG. 5 is a block diagram illustrating a matting apparatus for extracting a foreground object according to an example embodiment of the present invention.

FIG. 5 is a block diagram illustrating a matting apparatus for extracting a foreground object according to an example embodiment of the present invention.

Referring to FIG. 5, the matting apparatus 100 for extracting a foreground object may be implemented in an information processing apparatus capable of digital signal processing. Here, the information processing apparatus may include various terminals with one or more image sensors equipped therein for capturing an input image and with a capability of image processing for performing matting on the captured input image, wherein the various terminals may include a smartphone, a tablet PC, a personal digital assistant (PDA), a navigation system, a laptop computer, a computer, a smart electronic appliance, and a system robot. However, aspects of the present disclosure are not limited thereto, such that the information processing apparatus may include other various apparatuses that require matting techniques.

The matting apparatus 100 may include a pixel extractor 110, a nonlocal processor 120, a local processor 130, and a matting module 140.

The pixel extractor 110 may extract one or more pixels from a received input image and a received trimap of the input image.

Here, the input image may refer to an image or video captured by a TOF-based camera or an image sensor equipped in the information processing apparatus. If a target foreground object to be extracted from the input image has a region that represents a soft texture, such as fur, or a region that represents a hole, it may be difficult to clearly distinguish whether the corresponding region is a foreground region or a background region, and hence there may be limitations in performing high-quality image matting.

Accordingly, a user may receive the trimap as well as the input image, where the trimap defines a foreground region, a background region, and an unknown region in the input image. That is, the trimap may represent the input image by dividing it into a foreground region, a background region, and an unknown region.

The unknown region in the trimap may include a boundary region between the foreground region and the background region, i.e., the boundary line between an object and a non-object or an indistinct region that is hardly distinguishable between the foreground region and the background region due to unique appearance characteristics of the object.

In this case, pixels in the foreground region and pixels in the background region each have a clear opacity value, whereas unknown pixels in the unknown region have an indefinite opacity value, which makes it impossible to perform precise matting. Therefore, the present invention aims to obtain estimation of opacity values of unknown pixels in order to perform high-quality image matting.

To this end, the pixel extractor 110 may extract one or more unknown pixels having an indefinite opacity value from the input image and trimap.

In response to extraction of one or more unknown pixels having an indefinite opacity value, the nonlocal processor 120 may calculate a first processing cost by extracting one or more nonlocal neighboring pixels for each of the extracted unknown pixels which establish nonlocal relationships with a corresponding unknown pixel.

First, a feature vector for each unknown pixel having an indefinite opacity value may be generated. Here, the feature vector may be generated based on color information and location information of each pixel represented in the input image.

Once the feature vectors for the respective unknown pixels having an indefinite opacity value are generated, Euclidean distances among the pixels are computed using the feature vectors for the respective pixels. In this case, a K-nearest neighbors algorithm may be used to compute the Euclidean distances.

Accordingly, K number of pixels with the smallest Euclidean distances may be extracted as nonlocal neighboring pixels for each unknown pixel and the first processing cost for each of the unknown pixels may be calculated. Here, the first processing cost may be calculated using, but not limited to, a predefined cost function.

The local processor 130 may calculate a second processing cost by extracting one or more local neighboring pixels for each of the unknown pixels which establish local relationships with a corresponding unknown pixel.

More specifically, the local processor 130 may extract one or more pixels within a predefined range for extraction, which is based on each unknown pixel having an indefinite opacity value, as local neighboring pixels for a corresponding unknown pixel, wherein the local neighboring pixels establish local relationships with the corresponding unknown pixel, and the local processor 130 may calculate the second processing cost using a predefined cost function.

In response to the first and second processing costs for each unknown pixel being calculated, the matting module 140 may estimate an opacity value of each unknown pixel based on the calculated first and second processing costs for the unknown pixel, and perform matting on the input image.

To this end, the matting module 140 may compute a final processing cost using a predefined cost function such that the processing cost for each pixel can be minimized, and estimate an optimized opacity value of each unknown pixel based on the final processing cost.

As such, it is possible to precisely extract the foreground object from the input image through matting on the input image by using the optimized opacity values.

According to example embodiments as described above, the matting method and apparatus for extracting a foreground object may be capable of performing high-quality image matting regardless of conditions of a foreground object, such as appearance characteristics or colors, by which the foreground object is represented in an input image.

In addition, it is possible to perform high-quality image matting, and thus increase a performance in extracting a foreground object from an input image, so that the matting method and apparatus can be applied to multiple-purpose image editing software.

While the example embodiments of the present invention and their advantages have been described in detail, it should be understood that various changes, substitutions and alterations may be made herein without departing from the scope of the invention.

What is claimed is:

1. A matting method for extracting a foreground object, which is performed by an information processing apparatus capable of digital signal processing, the matting method comprising:
   extracting one or more pixels from a received input image and a received trimap of the input image;
   calculating a first processing cost based on a first predefined cost function by extracting one or more nonlocal neighboring pixels for each of the extracted pixels which establish nonlocal relationships with each of the extracted pixels;
   calculating a second processing cost based on a second predefined cost function by extracting, for each of the extracted pixels, one or more local neighboring pixels which are included within a predefined range for extraction and establish local relationships with each of the extracted pixels; and
   performing matting on the input image by estimating an opacity value of each of the extracted pixels based on both the first processing cost and the second processing cost,
   wherein the trimap is an image that represents the input image by dividing the input image into a foreground region, a background region, and an unknown region, and the extracting of the one or more pixels comprises extracting one or more pixels with an indefinite opacity value that are located in the input image and the unknown region of the trimap.

2. The matting method of claim 1, wherein the calculating of the first processing cost comprises generating a feature vector for each of the extracted pixels using color information and location information of each of the extracted pixels; extracting the one or more nonlocal neighboring pixels for each of the extracted pixels, which establish nonlocal relationships with each of the extracted pixels, by calculating distances among the pixels based on the generated feature vectors; and calculating the first processing cost for each of the extracted pixels using the extracted nonlocal neighboring pixels.

3. The matting method of claim 2, wherein the extracting of the one or more nonlocal neighboring pixels comprises calculating Euclidean distances among the extracted pixels using a K-nearest neighbors algorithm based on the feature vectors and extracting one or more pixels with smallest distances as the one or more nonfocal neighboring pixels.

4. The matting method of claim 1, wherein the calculating of the second processing cost comprises extracting one or more pixels within the predefined range for extraction that is based on each of the extracted pixels as the one or more local neighboring pixels that establish local relationships with each of the extracted pixels, and calculating the second processing cost for each of the extracted pixels using the one or more local neighboring pixels.

5. The matting method of claim 1, wherein the performing of the matting on the input image comprises computing a final processing cost using both the first processing cost and the second processing cost such that a processing cost for each of the extracted pixels can be minimized, and estimating an optimized opacity value for each of the extracted pixels based on the final processing cost.

6. The matting method of claim 5, wherein the optimized opacity value for each of the extracted pixels is used for the performing of the matting on the input image, thereby making it possible to extract a foreground object from the input image.

* * * * *